(12) United States Patent
Mitra (10) Patent No.: US 12,511,183 B2
(45) Date of Patent: Dec. 30, 2025

(54) STORAGE OF MACHINE CHECK EXCEPTIONS

(71) Applicant: Intel Corporation, Santa Clara, CA (US)

(72) Inventor: Sumanranjan Mitra, Bengaluru (IN)

(73) Assignee: Intel Corporation, Santa Clara, CA (US)

(*) Notice: Subject to any disclaimer, the term of this patent is extended or adjusted under 35 U.S.C. 154(b) by 716 days.

(21) Appl. No.: 17/671,009

(22) Filed: Feb. 14, 2022

(65) Prior Publication Data

US 2022/0171672 A1 Jun. 2, 2022

(51) Int. Cl.
G06F 11/00 (2006.01)
G06F 11/07 (2006.01)
G06F 11/30 (2006.01)
G06F 13/16 (2006.01)
G06F 13/28 (2006.01)

(52) U.S. Cl.
CPC ...... G06F 11/0784 (2013.01); G06F 11/0772 (2013.01); G06F 11/0793 (2013.01); G06F 11/3037 (2013.01); G06F 13/1668 (2013.01); G06F 13/28 (2013.01)

(58) Field of Classification Search
CPC ............ G06F 11/0772; G06F 11/0784; G06F 11/0793; G06F 11/3037; G06F 13/1668; G06F 13/28
See application file for complete search history.

(56) References Cited

U.S. PATENT DOCUMENTS

| | | | | |
|---|---|---|---|---|
| 4,459,658 | A * | 7/1984 | Gabbe | G06F 11/1451 714/E11.13 |
| 6,622,260 | B1 * | 9/2003 | Marisetty | G06F 11/0724 714/10 |
| 7,383,423 | B1 * | 6/2008 | Hughes | G06F 15/8007 712/28 |
| 9,317,360 | B2 * | 4/2016 | Vargas | G06F 11/0724 |
| 10,671,465 | B2 * | 6/2020 | Porwal | G06F 11/0736 |
| 2003/0074601 | A1 * | 4/2003 | Schultz | G06F 11/0706 714/E11.159 |
| 2005/0278574 | A1 * | 12/2005 | Kitamorn | G06F 11/0775 714/34 |
| 2006/0010352 | A1 * | 1/2006 | Mukherjee | G06F 11/0775 714/E11.026 |
| 2011/0154128 | A1 * | 6/2011 | Rajkumari | G06F 11/0709 714/48 |
| 2013/0339829 | A1 * | 12/2013 | Vargas | G06F 11/1004 714/807 |

(Continued)

OTHER PUBLICATIONS

Johnson, Kurt et al., "The Use of Machine Check Architecture (MCA) to Perform Reliability Studies on Servers", Quality & Productivity Research Conference, 2001, 19 pages.

(Continued)

*Primary Examiner* — Joshua P Lottich
(74) *Attorney, Agent, or Firm* — Compass IP Law PC (57) ABSTRACT

Examples described herein relate to circuitry to copy reported error data to a data structure in memory. In some examples, the reported error data includes a last reported error and at least one other reported error. In some examples, the circuitry utilizes a direct memory access (DMA) circuitry to copy the reported error data to the data structure in memory.

15 Claims, 5 Drawing Sheets

(56) References Cited

U.S. PATENT DOCUMENTS

| | | | | |
|---|---|---|---|---|
| 2014/0281757 A1* | 9/2014 | Lukas | ............... | G06F 11/0757 |
| | | | | 714/57 |
| 2015/0186231 A1* | 7/2015 | Auld | ............... | G06F 11/0793 |
| | | | | 714/27 |
| 2015/0347254 A1* | 12/2015 | Jones | ............... | G06F 11/0751 |
| | | | | 714/6.13 |
| 2017/0123879 A1* | 5/2017 | Donlin | ............... | G06F 11/079 |
| 2018/0150345 A1* | 5/2018 | Porwal | ............... | G06F 11/0724 |
| 2019/0303226 A1* | 10/2019 | Kim | ............... | G06F 11/073 |
| 2021/0200618 A1* | 7/2021 | Magro | ............... | G06F 3/0679 |
| 2022/0300372 A1* | 9/2022 | Bert | ............... | G06F 3/0619 |

OTHER PUBLICATIONS

Montgomery, Ashley, "Debugging Machine Check Exceptions on Embedded IA Platforms", Intel Embedded White Paper, Jul. 2010, 17 pages.

U.S. Appl. No. 17/671,009, Figure 1 Known Prior Art, Dec. 2021.

\* cited by examiner

STORAGE OF MACHINE CHECK EXCEPTIONS

BACKGROUND

In computing, Machine Check Architecture (MCA) specifies a manner by which a central processing unit (CPU) reports hardware errors to software, such as an operating system (OS), basic input/output system (BIOS), or a management entity (e.g., baseboard management controller (BMC)). Example hardware errors include system bus errors, error correction code (ECC) errors, parity errors, cache errors, or translation lookaside buffer (TLB) errors. Various model-specific registers (MSRs) are configured to initiate error reporting and for recording errors. Errors can be recorded in a test phase of a device or when a customer uses the device.

Figure 1:
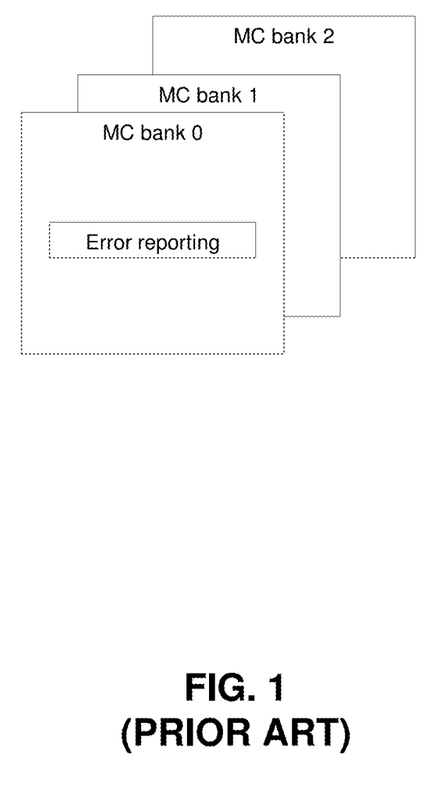
FIG. 1 depicts an example of registers.

FIG. 1 depicts an example system. In this system, errors from particular devices are allocated to particular register banks. For example, a register bank stores errors detected from operation of a power control unit (PCU), whereas another register bank stores errors detected from operation of a memory controller (MC), and yet another register bank stores errors detected from operation of a cache and home agent (CHA).

DETAILED DESCRIPTION

The bank register architecture of FIG. 1 allows storage of one exception at a time from a particular device. When multiple unrelated errors are reported that occur in quick successions, the onus is on error handling software to rapidly read and cache the errors into error handling software logs in real time. Prior errors can be overwritten or lost unless the error handling software is fast enough to process the errors. In some cases, the last error may not be useful for debugging or handling of the error or diagnosing errors in operation of a device. An overflow bit can provide a hint that there were earlier logged errors, but details of such earlier logged errors were lost or overwritten. As an example, where multiple correctable errors (MCE) are reported by memory, earlier MCE details such as exception address, processor context corrupted, or others can be lost if the MCE handling software is unable to process the reported MCEs before the MCEs are overwritten.

To record multiple reported errors, a Machine Check Architecture (MCA) subsystem can copy reported errors to memory (e.g., volatile or non-volatile memory) or otherwise persist errors stored in registers. The MCA subsystem can utilize circuitry that writes the error exception details to predetermined locations or data structures in system memory instead of or in addition to bank registers. Data structures can be implemented as scatter-gather circular linked list or contiguous arrays. The circuitry can include an input/output (I/O) peripheral direct memory access (DMA) engines to copy content from a register to system memory. The MCA subsystem can log the exceptions into predetermined data structures in system memory without overwriting earlier error data that were logged and were not processed by error handling software. In some cases, error data that was processed by error handling software can be deleted or removed from a list.

The MCA subsystem can potentially prevent loss of exception details due to overwriting of MCA exception registers by other exceptions. Exception handling software or a processor need not utilize bandwidth or clock cycles to retrieve exceptions from MCA exception details registers and store the exception details into system memory. In some examples, exception handling software or a processor can receive a retrieval notification when a programmable count of exception has occurred or a programmable time duration has elapsed. Exception handling software or a process need not conduct near real time retrieval and processing of exception details to prevent error detail loss. Exception handling software can access a sequence of errors or a single exception details that have occurred over time, which can improve compute system reliability because loss of exception data is mitigated. Exceptions or errors can be recoverable errors that can be corrected or addressed without requiring a system to restart. As exceptions are logged into software data structures in system memory, exception handling software outside the system on chip (SoC) (e.g., baseboard management controller (BMC) or peer CPU socket) can access the exceptions from the memory for processing.

Figure 2:
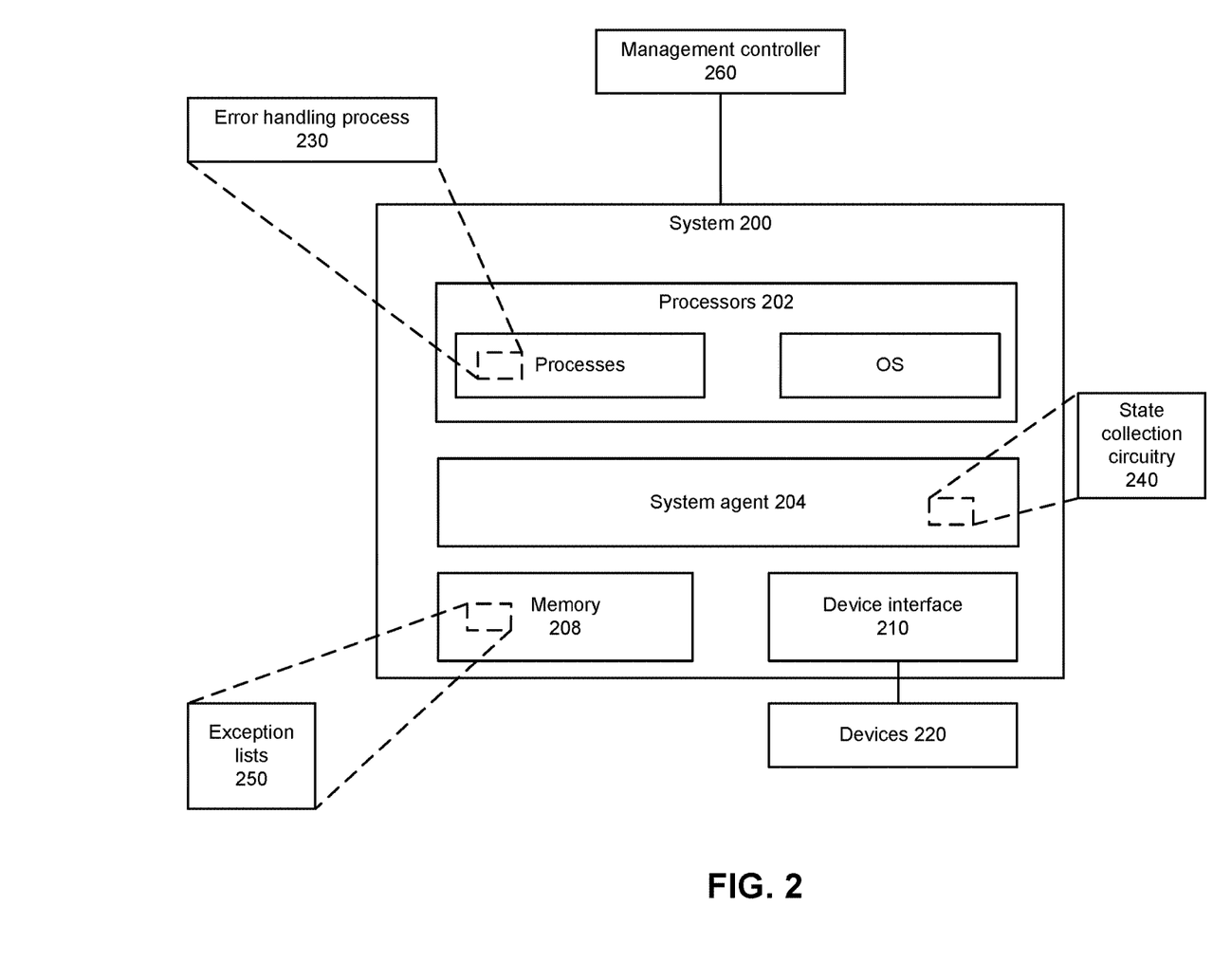
FIG. 2 depicts an example system.

FIG. 2 depicts an example system. The system can be implemented as part of a server, rack of servers, computing platform, or others. In some examples, processors 202 can include one or more of: a central processing unit (CPU) core, graphics processing unit (GPU), field programmable gate array (FPGA), accelerator (e.g., FPGA), and/or or application specific integrated circuit (ASIC). Processors 202 can include an XPU, where an XPU can include at least to: a CPU, a graphics processing unit (GPU), general purpose GPU (GPGPU), or other processing units (e.g., accelerator). In some examples, a core can be sold or designed by Intel®, ARM®, AMD®, Qualcomm®, Broadcom®, Nvidia®, IBM®, Texas Instruments®, among others.

Processors 202 can execute an operating system (OS), driver, and/or processes. In some examples, an OS can include Linux®, Windows® Server, FreeBSD®, Android®, MacOS®, iOS®, or any other operating system. A driver can provide configuration and use of any device such as devices 220. Various examples of devices 220 include an accelerator, network interface device, storage, memory, or other circuitry. A processor executed process can include one or more of: applications, virtual machines (VMs), containers, microservices, serverless applications, and so forth.

Processors 202 can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or lightweight container or virtual machine deployment, and decentralized continuous microservice delivery.

Processors 202 can execute a virtual machine (VM). A VM can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host.

Processors 202 can execute a container including a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

Processors 202 can execute error handling process 230. In some examples, error handling process 230 can execute with a VM, container, or as part of a microservice. Error handling process 230 can allocate an exception lists data structure 250 to store errors reported by one or more sub-systems, modules, or IP blocks in a SoC. One or more sub-systems can include: a power control unit (PCU), a memory controller (MC), or a cache and home agent (CHA). Examples of error details that can be generated include: errors arising from reading data from memory or storage, cyclic redundancy check (CRC) errors arising from writing data to memory or storage, memory scrubbing errors, instruction fetch errors, detected poisoned or corrupted data, watchdog timer error, and so forth.

Error handling process 230 can configure at least one register with a pointer to data structure(s) in system memory 208. In some examples, multiple pointers can be used to refer to multiple different linked lists in exception lists data structure 250. Exception lists data structure 250 can include separate error detail lists generated by different sub-systems (e.g., PCU, MC, CHA, and so forth). In some examples, exception lists data structure 250 can include a list of errors generated by multiple sub-systems. Exception lists data structure 250 can be accessed to retrieve error details by error handling software 230 or a management controller 260 (e.g., BMC). Instances of error handling software 230 may be executed on another processor on a peer SoC or management controller 260. One or more SoCs on a same or different computing platform may monitor the error details generated by another SoC.

Error handling process 230 can periodically access exception lists data structure 250 to retrieve error data in order to perform remedial actions. Remedial actions can include logging of the error for analysis to restarting of the system. Just an impacted process may be terminated by the OS in some cases. At times, remedial action may be taken after a certain threshold number of error occurrences have occurred. Remedial action can depend on the error and criticality as reported by the sub-systems.

An uncore or system agent 204 can include or more of a memory controller, a shared cache (e.g., last level cache (LLC)), a cache coherency manager, arithmetic logic units, floating point units, core or processor interconnects, Caching/Home Agent (CHA), or bus or link controllers. System agent 204 can provide one or more of: direct memory access (DMA) engine connection, non-cached coherent master connection, data cache coherency between cores and arbitrates cache requests, or Advanced Microcontroller Bus Architecture (AMBA) capabilities.

System agent 204 can include state collection circuitry 240. State collection circuitry 240 can collect errors issued by one or more sub-systems and write the errors into exception lists data structure 250. State collection circuitry 240 can access List Head Pointer register to determine a location in system memory 208 where list 250 is stored. In some examples, state collection circuitry 240 can write errors into a linked list that is part of exception lists data structure 250. In some examples, exception lists data structure 250 can be stored in a register as a linked list.

Data structure 250 can be circular linked lists, arrays or any other data structure that allows different devices connected to a bus (e.g., SoC cores, DMA circuitry, BMC, peer SoC, etc.) to access error data for retrieval of exception information.

State collection circuitry 240 can utilize a direct memory access (DMA) technology to copy error data from a buffer or register in which the error data is stored to the exception lists 250 in system memory 208. DMA is a technology that allows an input/output (I/O) device to bypass a central processing unit (CPU) or core, and to send or receive data directly to or from a system memory. Because DMA allows the CPU or core to not manage a copy operation when sending or receiving data to or from the system memory, the CPU or core can be available to perform other operations. Without DMA, when the CPU or core is using programmed input/output, the CPU or core is typically occupied for the entire duration of a read or write operation and is unavailable to perform other work. With DMA, the CPU or core can, for example, initiate a data transfer, and then perform other operations while the data transfer is in progress. The CPU or core can receive an interrupt from a DMA controller when the data transfer is finished. Instead of, or in addition to, use of DMA controller, a microcontroller running may be deployed to copy errors to system memory linked list 250.

Memory 208 can include one or more of: one or more registers, one or more cache devices (e.g., level 1 cache (L1), level 2 cache (L2), level 3 cache (L3), last level cache (LLC)), volatile memory device, non-volatile memory device, or persistent memory device. For example, memory 208 can include static random access memory (SRAM) memory technology or memory technology consistent with high bandwidth memory (HBM), or double data rate (DDR), among others.

Memory mirroring can be used to protect against uncorrectable errors occurring in memory 208 that is used to store exception lists data structure 250 to duplicate data structure 250 into one or more other memory devices. In some examples, exception lists data structure 250 can be stored into non-volatile or persistent memory so that exception lists data structure 250 is persisted if power to memory 208 is lost. In some examples, exception lists data structure 250 can be stored into registers that can store multiple errors reported for a particular device. Exception lists data structure 250 can be stored in in persistent memory (e.g., 3D Crosspoint memory) organized in 2 level memory (2LM) mode for retaining error data over system power cycles.

Memory 208 can be connected to processors 202 and/or devices 220 using device interface 210. Device interface 210 can be consistent with Double Data Rate (DDR), Compute Express Link (CXL) (e.g., Compute Express Link Specification revision 2.0, version 0.9 (2020), as well as earlier versions, revisions or variations thereof), Peripheral Component Interconnect express (PCIe) (e.g., PCI Express Base Specification 1.0 (2002), as well as earlier versions, revisions or variations thereof), or other interfaces. In some examples, system 200 can be formed as a system on chip (SoC).

Figure 3:
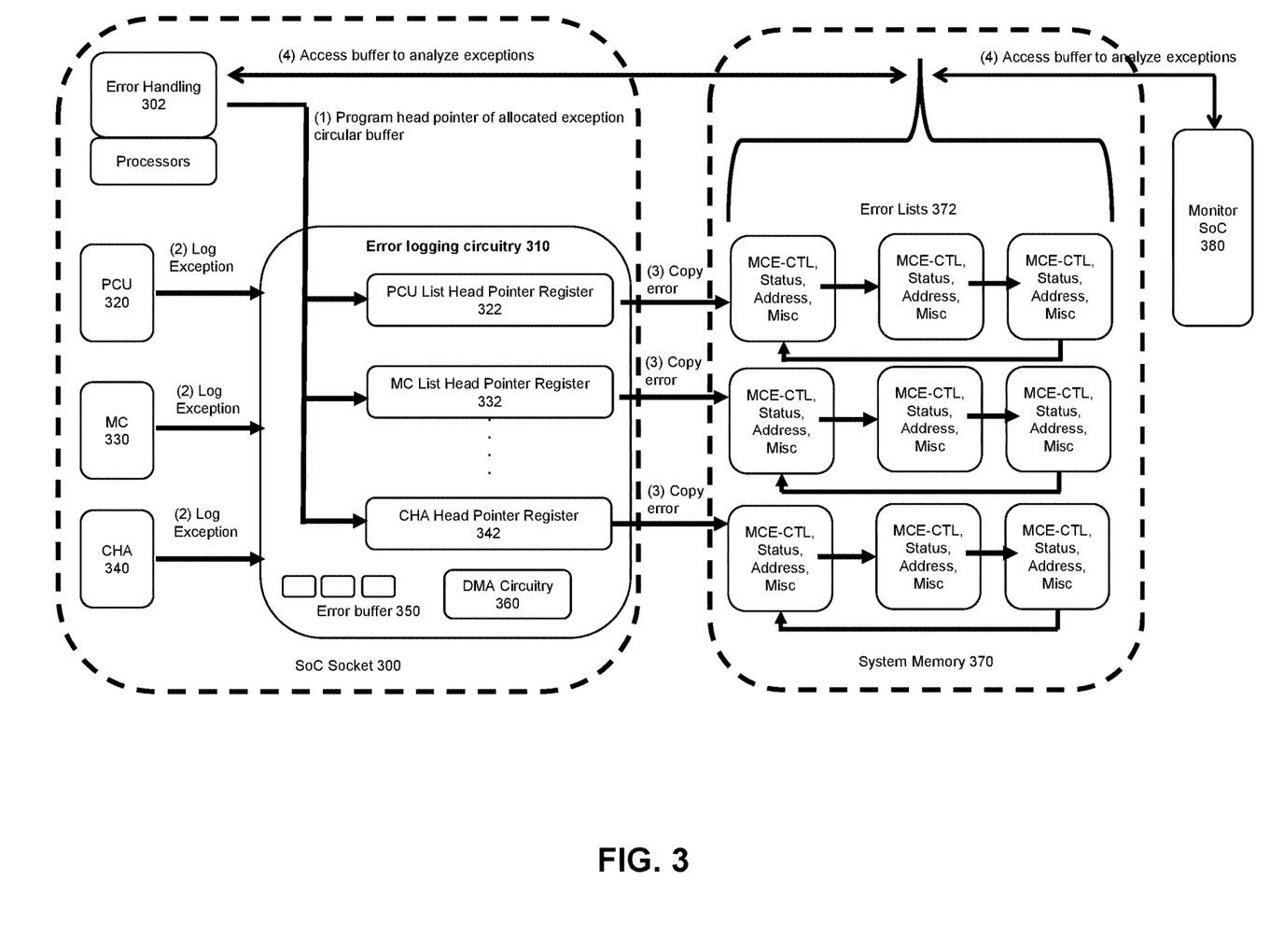
FIG. 3 depicts an example operation.

FIG. 3 depicts an example system operation. At (1) process error handling 302 executed by one or more processors, in SoC socket 300, can program header pointers for PCU 320, MC 330, and CHA 340 into registers 322, 332, and 342. Header pointers can refer to an allocated exception circular buffer of a corresponding list in system memory 370 in which to store errors. At (2), various sub-systems (e.g., PCU 320, MC 330, or CHA 340) can log errors to error buffer 350. At (3), error logging circuitry 310 can utilize DMA circuitry 360 to store errors into lists 372 in system memory 370 identified by header pointers in registers 322, 332, and/or 342. Lists 372 can include circular linked list data-structure that store errors or exceptions. A sub-system may have a separate allocated list. Error logging circuitry 310 can access <Block name> List Head Pointer register to determine a location in system memory 370 where a list is stored. Error logging circuitry 310 may be implemented as a very large-scale integration (VLSI) logic or a microcontroller executing software. At (4), error handling 302 can access error lists 372 to analyze exceptions and potentially perform remedial actions.

In some examples, at (4), in addition, or alternative to error handling 302 accessing error lists 372 to analyze exceptions and potentially perform remedial actions, monitor SoC socket 380 (e.g., BMC SoC) can access error lists 372 to analyze exceptions and potentially perform remedial actions. The location of the error list(s) 372 in system memory 370 can be communicated to monitoring SoC 308 so that they can access memory addresses that store the error lists 372. Instances of error handling software 302 may execute on other CPUs on peer SoC or BMC (e.g., SoC 380) so that other SoCs on a same or different computing platform may monitor the series of errors occurring on another SoC. The format of the error list can be configured into error handling software instance(s). Error handling software 302 may periodically retrieve and process the list or may be interrupted by error logging circuitry when the list is to be retrieved and processed to retrieve logged error data. In some examples, error logging circuitry can be consistent with MCA.

Figure 4:
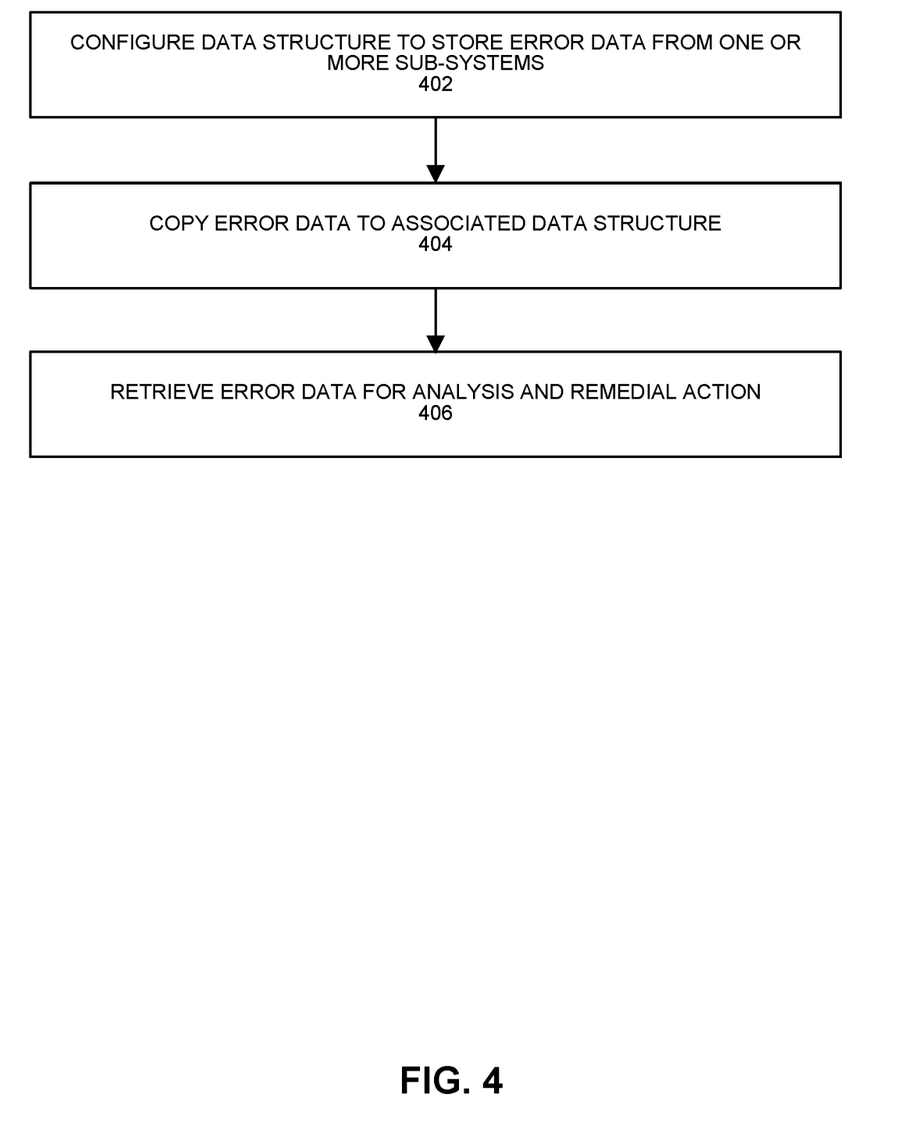
FIG. 4 depicts an example process.

FIG. 4 depicts an example process. The process can be performed by an operating system, uncore, system agent, or other processor to record device multiple errors and access sub-system errors. At 402, a location of a data structure to store errors indicated by a sub-system can be configured. The location of the data structure can be in a system memory. The data structure can store multiple errors indicated by a particular sub-system or multiple sub-systems in order of receipt.

At 404, based on a sub-system error being written to a register, the error data can be copied to the data structure. In some cases, the error data can be copied to a linked list associated with the sub-system that issued the error data. A DMA circuitry or dedicated microprocessor can copy the error data.

At 406, the error data can be retrieved for analysis. In some examples, remedial action can be performed to correct the reported error. For example, an error handling process executed by a processor in a same socket as that of the sub-systems can retrieve the error data and potentially perform remedial action. For example, a management controller in a different socket as that of the sub-systems that issued the errors can retrieve the error data and potentially perform remedial action.

Figure 5:
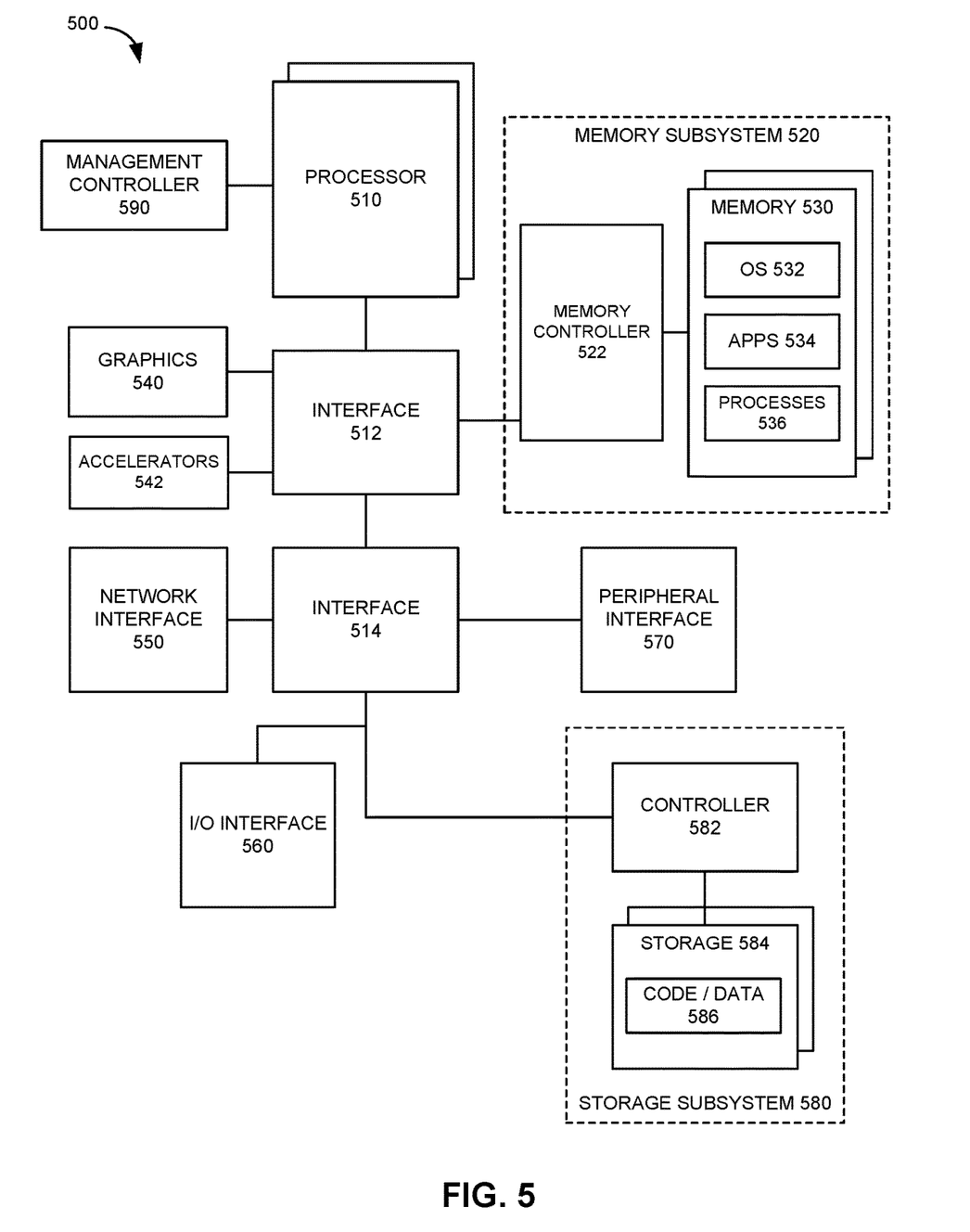
FIG. 5 depicts an example system.

FIG. 5 depicts an example computing system. Components of system 500 (e.g., processor 510, network interface 550, and so forth) can be configured to store error data, retrieve error data, and/or perform remedial actions, as described herein. System 500 includes processor 510, which provides processing, operation management, and execution of instructions for system 500. Processor 510 can include any type of microprocessor, central processing unit (CPU), graphics processing unit (GPU), processing core, or other processing hardware to provide processing for system 500, or a combination of processors. Processor 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 500 includes interface 512 coupled to processor 510, which can represent a higher speed interface or a high throughput interface for system components that needs higher bandwidth connections, such as memory subsystem 520 or graphics interface components 540, or accelerators 542. Interface 512 represents an interface circuit, which can be a standalone component or integrated onto a processor die. Where present, graphics interface 540 interfaces to graphics components for providing a visual display to a user of system 500. In one example, graphics interface 540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 540 generates a display based on data stored in memory 530 or based on operations executed by processor 510 or both. In one example, graphics interface 540 generates a display based on data stored in memory 530 or based on operations executed by processor 510 or both.

Accelerators 542 can be a fixed function or programmable offload engine that can be accessed or used by a processor 510. For example, an accelerator among accelerators 542 can provide compression (DC) capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 542 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 520 represents the main memory of system 500 and provides storage for code to be executed by processor 510, or data values to be used in executing a routine. Memory subsystem 520 can include one or more memory devices 530 such as read-only memory (ROM), flash memory, one or more varieties of random access memory (RAM) such as DRAM, or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It will be understood that memory controller 522 could be a physical part of processor 510 or a physical part of interface 512. For example, memory controller 522 can be an integrated memory controller, integrated onto a circuit with processor 510.

Management controller 590 can perform tasks on behalf of a data center administrator such as power cycling a server, monitoring hardware failures, monitoring device temperature, monitoring cooling fan speeds, monitoring power status, monitoring operating system (OS) status, and so forth. Management controller 590 can monitor sensors and can send alerts to a system administrator of parameter abnormalities (e.g., parameters not within pre-set limits). Other devices can be used instead of management controller 590, including a virtual machine, container, microservice, process, software, processor, accelerator, network interface device or other circuitry.

As described herein, application 534 can configure operation of circuitry to copy error data to a data structure in memory 530. An application 534 or manageability controller 590 can access error data for analysis and/or perform remedial actions, as described herein.

While not specifically illustrated, it will be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 500 includes interface 514, which can be coupled to interface 512. In one example, interface 514 represents an interface circuit, which can include stand-alone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a device that is in the same data center or rack or a remote device, which can include sending data stored in memory.

Network interface 550 can include one or more of: a network interface controller (NIC), a remote direct memory access (RDMA)-enabled NIC, SmartNIC, router, switch, or network-attached appliance. Some examples of network interface 550 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data 586 in a persistent state (e.g., the value is retained despite interruption of power to system 500). Storage 584 can be generically considered to be a "memory," although memory 530 is typically the executing or operating memory to provide instructions to processor 510. Whereas storage 584 is nonvolatile, memory 530 can include volatile memory (e.g., the value or state of the data is indeterminate if power is interrupted to system 500). In one example, storage subsystem 580 includes controller 582 to interface with storage 584. In one example controller 582 is a physical part of interface 514 or processor 510 or can include circuits or logic in both processor 510 and interface 514.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as those consistent with specifications from JEDEC (Joint Electronic Device Engineering Council) or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), a combination of one or more of the above, or other memory.

A power source (not depicted) provides power to the components of system 500. More specifically, power source typically interfaces to one or multiple power supplies in system 500 to provide power to the components of system 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 500 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMB A) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: circuitry to copy reported error data to a data structure in memory, wherein the reported error data includes a last reported error and at least one other reported error.

Example 2 includes one or more examples, wherein the circuitry comprises a direct memory access (DMA) circuitry to copy the reported error data to the data structure in memory.

Example 3 includes one or more examples, wherein the data structure comprises multiple linked lists and at least one linked list is associated with errors reported by a particular sub-system.

Example 4 includes one or more examples, wherein the reported error data is associated with one or more of: a power control unit (PCU), a memory controller (MC), or a cache and home agent (CHA).

Example 5 includes one or more examples, wherein the data structure is accessible to a management controller.

Example 6 includes one or more examples, wherein the management controller is positioned on a different system on chip than that of the circuitry.

Example 7 includes one or more examples, and includes a system agent, wherein the system agent comprises the circuitry.

Example 8 includes one or more examples, and includes a processor to execute a process to program a pointer to the data structure in memory wherein the pointer is utilized by logging circuitry to identify the data structure in memory.

Example 9 includes one or more examples, and includes a computer-readable medium comprising instructions stored thereon, that if executed by one or more processors, cause the one or more processors to: configure circuitry to copy reported error data to a data structure in memory, wherein the reported error data includes a last reported error and at least one other reported error.

Example 10 includes one or more examples, wherein the circuitry comprises a direct memory access (DMA) circuitry to copy the reported error data to the data structure in memory.

Example 11 includes one or more examples, wherein the data structure comprises multiple linked lists and at least one linked list is associated with errors reported by a particular sub-system.

Example 12 includes one or more examples, wherein the reported error data is associated with one or more of: a power control unit (PCU), a memory controller (MC), or a cache and home agent (CHA).

Example 13 includes one or more examples, wherein the data structure is accessible to a management controller.

Example 14 includes one or more examples, wherein the management controller is positioned on a different system on chip than that of the circuitry.

Example 15 includes one or more examples, and includes instructions stored thereon, that if executed by one or more processors, cause the one or more processors to: identify a pointer to the data structure in memory.

Example 16 includes one or more examples, and includes a method comprising: copying reported error data to a data structure in memory, wherein the reported error data includes a last reported error and at least one other reported error.

Example 17 includes one or more examples, wherein the copying comprises using a direct memory access (DMA) circuitry to copy the reported error data to the data structure in memory.

Example 18 includes one or more examples, wherein the data structure comprises multiple linked lists and at least one linked list is associated with errors reported by a particular sub-system.

Example 19 includes one or more examples, wherein the reported error data is associated with one or more of: a power control unit (PCU), a memory controller (MC), or a cache and home agent (CHA).

Example 20 includes one or more examples, wherein the data structure is accessible to a management controller.

What is claimed is:

1. An apparatus comprising:
an interface and
circuitry, coupled to the interface, the circuitry to copy a batch of multiple reported error data to a data structure in memory, wherein:
the circuitry comprises a direct memory access (DMA) circuitry to copy the multiple reported error data to the data structure in memory,
the batch of multiple reported error data includes a last reported error and at least one other reported error,
the multiple reported error data comprises error reporting of different components of a system on chip (SoC), and
the different components of the SoC comprise one or more of a power control unit (PCU), a memory controller (MC), or a cache and home agent (CHA).

2. The apparatus of claim 1, wherein the data structure comprises multiple linked lists and at least one linked list is associated with errors reported by a particular sub-system.

3. The apparatus of claim 1, wherein the data structure is accessible to a management controller.

4. The apparatus of claim 3, wherein the management controller is positioned on a different system on chip than that of the circuitry.

5. The apparatus of claim 1, comprising a system agent, wherein the system agent comprises the circuitry.

6. The apparatus of claim 5, wherein the system agent includes four or more of: a memory controller, a shared cache, a cache coherency manager, arithmetic logic units, floating point units, core or processor interconnects, Caching/Home Agent (CHA), or bus or link controllers.

7. The apparatus of claim 1, comprising a processor to execute a process to program a pointer to the data structure in memory wherein the pointer is utilized by logging circuitry to identify the data structure in memory.

8. At least one non-transitory computer-readable medium comprising instructions stored thereon, that if executed by one or more processors, cause the one or more processors to:
configure circuitry to copy multiple reported error data to a data structure in memory, wherein:
the multiple reported error data includes a last reported error and at least one other reported error,
the circuitry comprises a direct memory access (DMA) circuitry to copy the multiple reported error data to the data structure in memory,
the multiple reported error data comprises error reporting of different portions of a system on chip (SoC), and
the different portions of the SoC comprise one or more of a power control unit (PCU), a memory controller (MC), or a cache and home agent (CHA).

9. The computer-readable medium of claim 8, wherein the data structure comprises multiple linked lists and at least one linked list is associated with errors reported by a particular sub-system.

10. The computer-readable medium of claim 8, wherein the data structure is accessible to a management controller.

11. The computer-readable medium of claim 10, wherein the management controller is positioned on a different system on chip than that of the circuitry.

12. The computer-readable medium of claim 8, comprising instructions stored thereon, that if executed by one or more processors, cause the one or more processors to:
identify a pointer to the data structure in memory.

13. A method comprising:
copying multiple reported error data to a data structure in memory, wherein;
the multiple reported error data includes a last reported error and at least one other reported error,
the copying comprises using a direct memory access (DMA) circuitry to copy the multiple reported error data to the data structure in memory
the multiple reported error data comprises error reporting of different portions of a system on chip (SoC), and
the different portions of the SoC comprise one or more of a power control unit (PCU), a memory controller (MC), or a cache and home agent (CHA).

14. The method of claim 13, wherein the data structure comprises multiple linked lists and at least one linked list is associated with errors reported by a particular sub-system.

15. The method of claim 13, wherein the data structure is accessible to a management controller.

* * * * *